US009495935B2

(12) United States Patent
Xu et al.

(10) Patent No.: US 9,495,935 B2
(45) Date of Patent: Nov. 15, 2016

(54) CAPACITIVE IN-CELL TOUCH SCREEN PANEL HAVING A COMMON ELECTRODE LAYER PROVIDED WITH SENSING AND DRIVING ELECTRODES

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Yubo Xu, Beijing (CN); Ming Hu, Beijing (CN); Guolei Wang, Beijing (CN); Byung Cheon Lim, Beijing (CN)

(73) Assignees: HEFEI BOE Optoelectronics Technology Co., Ltd., Hefei, Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/347,837

(22) PCT Filed: May 16, 2013

(86) PCT No.: PCT/CN2013/075735
§ 371 (c)(1),
(2) Date: Mar. 27, 2014

(87) PCT Pub. No.: WO2014/134873
PCT Pub. Date: Sep. 12, 2014

(65) Prior Publication Data
US 2015/0029118 A1    Jan. 29, 2015

(30) Foreign Application Priority Data

Mar. 5, 2013  (CN) .......................... 2013 1 0069874

(51) Int. Cl.
*G06F 3/041* (2006.01)
*G09G 3/36* (2006.01)
(Continued)

(52) U.S. Cl.
CPC ............. *G09G 3/3696* (2013.01); *G06F 3/044* (2013.01); *G06F 3/0412* (2013.01); *G02F 1/13338* (2013.01); *G09G 2310/0243* (2013.01)

(58) Field of Classification Search
CPC ........................ G06F 2203/04111–2203/04113
USPC .................................................. 345/173–174
See application file for complete search history.

(56) References Cited

U.S. PATENT DOCUMENTS

2006/0077186 A1* 4/2006 Park et al. .................... 345/173
2010/0302201 A1  12/2010 Ritter et al.
(Continued)

FOREIGN PATENT DOCUMENTS

| CN | 101907963 A | 12/2010 |
| CN | 101923257 A | 12/2010 |

(Continued)

OTHER PUBLICATIONS

International Search Report for International Application No. PCT/CN2013/075735, 13pgs.

(Continued)

*Primary Examiner* — Long D Pham
(74) *Attorney, Agent, or Firm* — Banner & Witcoff, Ltd.

(57) ABSTRACT

The present invention discloses a capacitive touch module, a capacitive in-cell touch screen panel and a display device, in which an integrally connected common electrode layer in an array substrate is split to form touch sensing electrodes and touch driving electrodes which are insulated from each other; and the touch driving electrodes and the touch sensing electrodes are subjected to time-sharing drive to achieve the touch function and the display function. Moreover, each touch sensing electrode includes a plurality of touch sensing sub-electrodes; each touch driving electrode includes a plurality of touch driving sub-electrodes; and opposing sides of adjacent touch sensing sub-electrodes and touch driving sub-electrodes are broken lines. Therefore, the opposing area between the adjacent touch driving electrodes and the adjacent touch sensing electrodes can be increased, and hence the mutual capacitance between the touch driving electrodes and the touch sensing electrodes within the unit area can be increased, and consequently the sensing sensitivity of the touch screen in the touch-control process can be improved.

6 Claims, 3 Drawing Sheets

(51) Int. Cl.
*G06F 3/044* (2006.01)
*G02F 1/1333* (2006.01)

(56) References Cited

U.S. PATENT DOCUMENTS

2011/0242444 A1* 10/2011 Song ................ 349/43
2013/0050130 A1* 2/2013 Brown .............. 345/174
2013/0335366 A1* 12/2013 Lee et al. ......... 345/174

FOREIGN PATENT DOCUMENTS

| CN | 102043531 A | 5/2011 |
| CN | 202126673 U | 1/2012 |
| CN | 102945106 A | 2/2013 |
| CN | 203117953 U | 8/2013 |
| DE | 102010042884 A1 | 4/2011 |

OTHER PUBLICATIONS

May 5, 2015—(CN)—First Office Action for Appn 201310069847.8 with Eng Tran.
Aug. 6, 2015—(CN) Second Office Action Appn 201310069874.8 with Eng Tran.
Sep. 8, 2015—International Preliminary Report on Patentability Appn PCT/CN2013/075735.
Jan. 6, 2016—(CN)—Third Office Action Appn 201310069874.8 with English Tran.

* cited by examiner

CAPACITIVE IN-CELL TOUCH SCREEN PANEL HAVING A COMMON ELECTRODE LAYER PROVIDED WITH SENSING AND DRIVING ELECTRODES

CROSS REFERENCE TO RELATED APPLICATIONS

This application is based on International Application No. PCT/CN2013/075735 filed on May 16, 2013, which claims priority to Chinese National Application No. 201310069874.8 filed on Mar. 5, 2013. The entire contents of each and every foregoing application are incorporated herein by reference.

TECHNICAL FIELD

Embodiments of the present invention relate to a capacitive touch module, a capacitive in-cell touch screen panel and a display device.

BACKGROUND

With the rapid development of the display technology, touch screen panels have been gradually widely used in daily life of people. Currently, in accordance with the composition structure, touch screen panels can be divided into: add-on mode touch screen panels, on-cell touch screen panels and in-cell touch screen panels. An add-on mode touch screen panel is manufactured by separately producing a touch screen and a liquid crystal display (LCD) and then bonding them together to form an LCD with the touch function. The add-on mode touch screen panel has the defects of high manufacturing cost, low light transmission rate, large module thickness and the like. But in an in-cell touch screen panel, the touch electrodes of the touch screen is embedded into the LCD, so that not only the overall thickness of the module can be reduced but also the manufacturing cost of the touch screen panel can be greatly reduced, and hence the in-cell touch screen panel is more favored by major panel manufacturers.

Currently, an existing capacitive in-cell touch screen panel is achieved by directly additionally arranging touch scanning lines and touch sensing lines on the traditional thin-film transistor (TFT) array substrate, namely two layers of strip electrodes which are intersected with each other on different planes are manufactured on a surface of the TFT array substrate and respectively act as touch drive lines and the touch sensing lines of the touch screen panel, and mutual capacitance is generated at the noncoplanar intersecting position of the two electrodes. The working process of the capacitive in-cell touch screen panel is as follows: when touch drive signals are applied to the electrode taken as the touch drive lines, voltage signals generated by coupling of the touch sensing lines through the mutual capacitance are detected; and in this process, where a human body contacts the touch screen panel, the electric field of the human body acts on the mutual capacitance, so that the capacitance value of the mutual capacitance is changed, and subsequently the voltage signals generated by coupling of the touch sensing lines is changed, and consequently the position of the contact point can be determined according to the variation of the voltage signals.

In the structural design of the capacitive in-cell touch screen panel, new film layers must be additionally arranged on a traditional array substrate, and hence new processes must be added in the process of manufacturing the array substrate, and consequently the production costs can be increased and the production efficiency cannot be desirably improved. Therefore, when the capacitive in-cell touch screen panel is designed, it may be considered that a common electrode layer in the LCD is used, and the integrally connected common electrode layer is divided to form touch sensing electrodes and touch driving electrodes which are insulated from each other. Mutual capacitance is formed between the touch sensing electrodes and the touch driving electrodes. The time for displaying each frame of the touch screen panel is divided into a display interval and a touch interval. In the display interval, common electrode signals are applied to the touch driving electrodes and the touch sensing electrodes so as to achieve the function of the common electrode layer; and in the touch interval, touch scanning signals are applied to the touch driving electrodes, and voltage signals generated by coupling of the touch sensing electrodes through the mutual capacitance are detected. In the process, where a human body contacts the touch screen panel, the electric field of the human body will affect the capacitance value of the mutual capacitance, and hence the voltage signals generated by coupling of the touch sensing electrodes can be changed, and consequently the positions of contact point can be determined according to the variation of the voltage signals.

In the capacitive in-cell touch screen panel with the common electrode layer in a multiplex manner, when the common electrode layer is split, an ordinary square pattern is generally adopted. That is to say, as illustrated in FIG. 1, touch driving electrodes Tx and touch sensing electrodes Rx adopt square patterns; and the mutual capacitance produced between the touch sensing electrodes Rx and the touch driving electrodes Tx is very small so that the influence of the electric field of the human body on the variation of the mutual capacitance is very small as well. Where the human body contacts the touch screen panel, the variation of the voltage signals generated by coupling of the touch sensing electrodes is very small, and hence the sensing sensitivity of the touch screen panel is very low.

SUMMARY

Embodiments of the present invention provide a capacitive touch module, a capacitive in-cell touch screen panel, and a display device, which are configured to improve the sensing sensitivity of the capacitive touch screen panel in the touch process.

An embodiment of the present invention provides a capacitive in-cell touch screen, which comprises an array substrate provided with a common electrode layer, wherein the common electrode layer is provided with touch sensing electrodes and touch driving electrodes which are insulated from each other; each touch sensing electrode includes a plurality of touch sensing sub-electrodes; each touch driving electrode includes a plurality of touch driving sub-electrodes; opposing sides of adjacent touch sensing sub-electrodes and touch driving sub-electrodes are broken lines; in a display interval, common electrode signals are applied to the touch driving electrodes and the touch sensing electrodes; and in a touch interval, touch scanning signals are applied to the touch driving electrodes, and the touch sensing electrodes are configured to generate by coupling and output voltage signals of the touch scanning signals.

An embodiment of the present invention provides a capacitive touch module, which comprises a touch electrode layer provided with touch sensing electrodes and touch driving electrodes which are insulated from each other. Each touch sensing electrode includes a plurality of touch sensing sub-electrodes; each touch driving electrode includes a plurality of touch driving sub-electrodes; and opposing sides of adjacent touch sensing sub-electrodes and touch driving sub-electrodes are broken lines.

An embodiment of the present invention provides a display device, which comprises the capacitive in-cell touch screen panel provided by the embodiment of the present invention or the capacitive touch module provided by the embodiment of the present invention.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
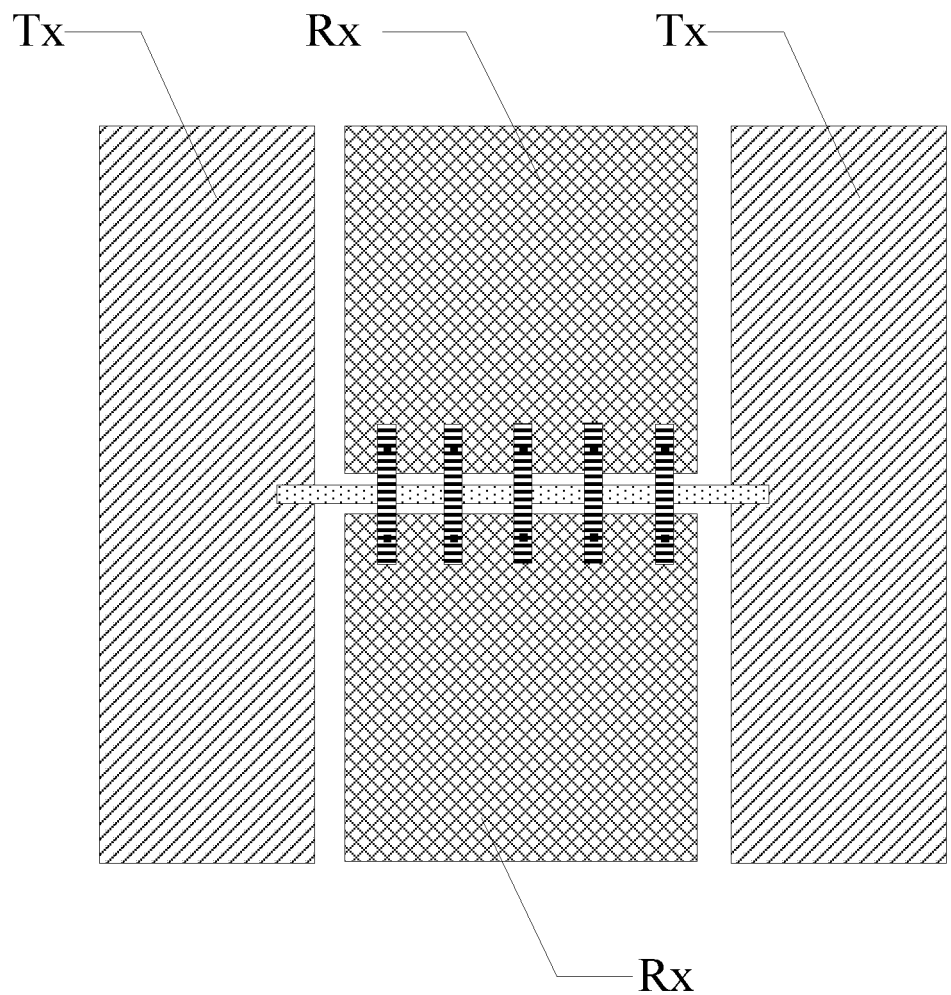
FIG. 1 is a schematic structural view of a common electrode layer in a conventional touch screen panel.

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Detailed description will be given below to the examples of the capacitive touch module, the capacitive in-cell touch screen panel and the display device provided by the embodiments of the present invention with reference to the accompanying drawings.

The thickness and the shape of various film layers in the accompanying drawings do not reflect the real scale of the array substrate and are only intended to illustrate the embodiments of the present invention.

An embodiment of the present invention provides a capacitive in-cell touch screen panel, which comprises an array substrate provided with a common electrode layer. The common electrode layer is provided with touch sensing electrodes and touch driving electrodes which are insulated from each other.

Each touch sensing electrode includes a plurality of touch sensing sub-electrodes; each touch driving electrode includes a plurality of touch driving sub-electrodes; opposing sides of adjacent touch sensing sub-electrodes and touch driving sub-electrodes are broken lines;

In the display interval, common electrode signals are applied to both the touch driving electrodes and the touch sensing electrodes;

In the touch interval, touch scanning signals are applied to the touch driving electrodes, and the touch sensing electrodes are configured to generate by coupling and output voltage signals of the touch scanning signals.

In the above touch screen panel provided by the embodiment of the present invention, the opposing sides of the adjacent touch sensing sub-electrodes and touch driving sub-electrodes are broken lines, and compared with the traditional scheme in which opposing sides of adjacent touch driving electrodes and adjacent touch sensing electrodes are straight lines, the opposing area between the adjacent touch driving electrodes and the adjacent touch sensing electrodes is increased, and hence the mutual capacitance between the touch driving electrodes and the touch sensing electrodes within a unit area can be increased, and consequently the sensing sensitivity of the touch screen panel in the touch-control process can be improved.

Specifically, the above touch screen panel provided by the embodiment of the present invention may be applicable to various modes of LCD panels, for instance, may be applicable to in-plane switch (IPS) mode and advanced super dimension switch (ADS) mode LCD panels with wide viewing angle, and may also be applicable to the traditional twisted nematic (TN) mode LCD panels. No limitation thereto will be given here. Therefore, in the touch screen panel provided by the embodiment of the present invention, the array substrate provided with the common electrode layer, for instance, may be specifically a color filter substrate in the LCD panel under the TN mode, or for instance, may also be specifically a TFT array substrate in the LCD panel under the ADS mode. No limitation thereto will be given here.

Specifically, in the above capacitive touch screen panel provided by the embodiment of the present invention, the integrally connected common electrode layer is split to form the touch sensing electrodes and the touch driving electrodes which are insulated from each other. In the specific examples, various touch sensing electrodes formed by the common electrode layer are generally extended along the column direction of pixel units in the LCD panel, and various touch driving electrodes are generally extended along the row direction of the pixel units in the LCD panel; or various touch sensing electrodes formed by the common electrode layer are generally extended along the row direction of the pixel units in the LCD panel, and various touch driving electrodes are generally extended along the column direction of the pixel units in the LCD panel. Of course, the touch sensing electrodes and the touch driving electrodes may also be extended along other directions. No limitation thereto will be given here.

Description will be given below by taking the case that various touch sensing electrodes are extended along the column direction of the pixel units in the LCD panel and various touch driving electrodes are extended along the row direction of the pixel units in the LCD panel as an example.

In general, the precision of the touch screen panel is generally in an order of millimeters. The density and the width of the touch driving electrodes and the touch sensing electrodes may be selected according to the required touch precision so as to guarantee the required touch precision. In general, the width of the touch driving electrodes and the touch sensing electrodes may be controlled to be from 5 to 7 mm. But the display precision of the LCD is generally in an order of micrometers. Therefore, in general, one touch driving electrode and one touch sensing electrode can cover a plurality of rows or a plurality of columns of LCD pixel units. Moreover, in general, the common electrode layer is split to form the required touch driving electrodes and the required touch sensing electrodes along gaps between the pixel units, so that the integrity of the common electrode layer in each pixel unit can be guaranteed. The precision referred to in the embodiment of the present invention refers to the size of one touch unit of the touch screen panel or the size of a pixel unit of the display panel.

Figure 2:
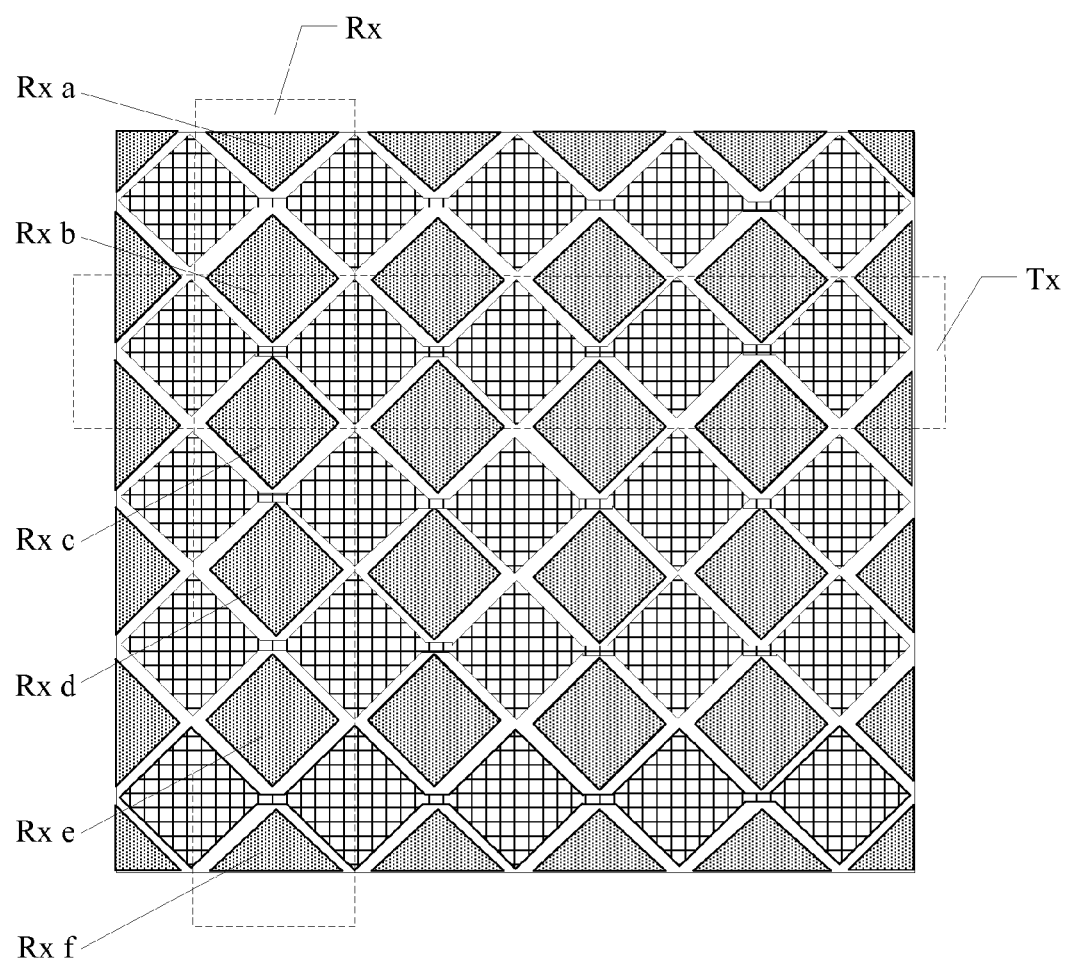
FIG. 2 is a schematic diagram illustrating the state in which touch driving electrodes and touch sensing electrodes in a touch screen panel provided by an embodiment of the present invention have a diamond electrode structure.
Figure 3:
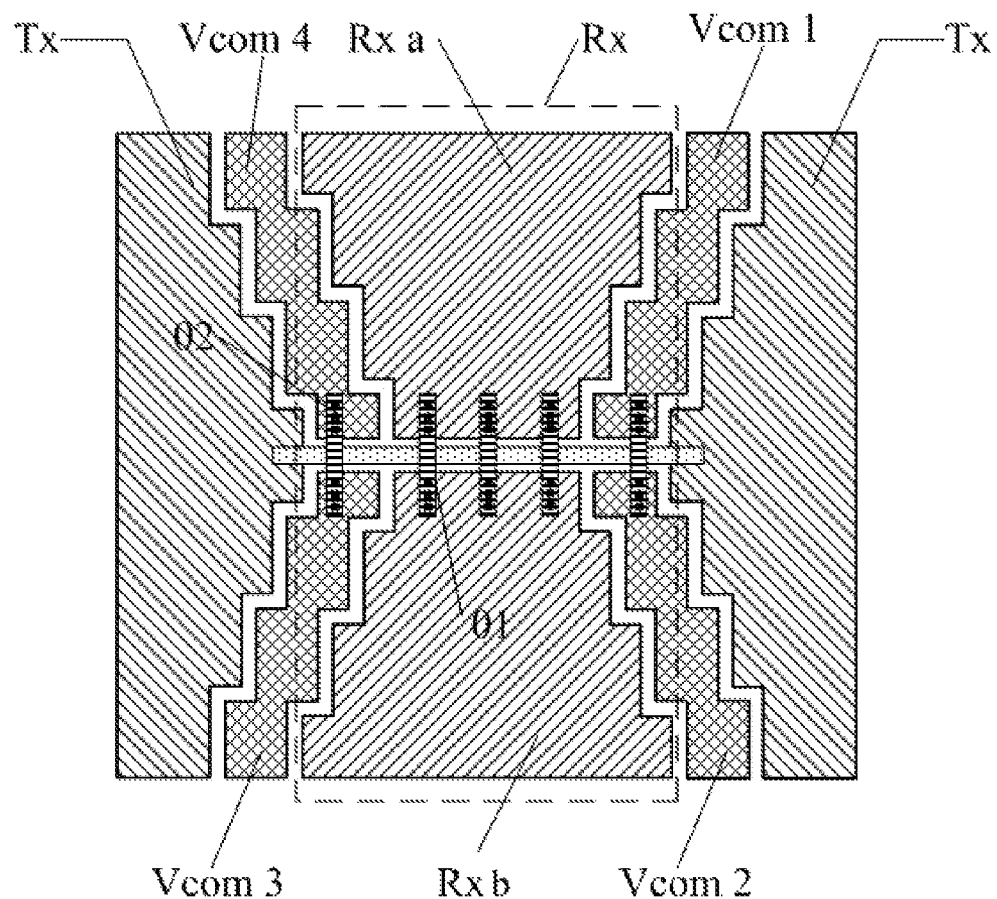
FIG. 3 is a schematic diagram illustrating the state in which the touch driving electrodes and the touch sensing electrodes in the touch screen panel provided by an embodiment of the present invention have a strip electrode structure.

Specifically, the touch driving electrodes and the touch sensing electrodes arranged in the common electrode layer may have a diamond electrode structure (as illustrated in FIG. 2) or a strip electrode structure (as illustrated in FIG. 3). The touch sensing electrodes Rx as illustrated in FIGS. 2 and 3 are arranged along the vertical direction in the figures, and the touch driving electrodes Tx are arranged along the horizontal direction in the figures. Because the touch sensing electrodes Rx and the touch driving electrodes Tx are arranged on the same layer, each touch driving electrode may be split into a plurality of touch driving sub-electrodes which are insulated from each other, namely the touch driving electrode may include a plurality of touch driving sub-electrodes which are connected with each other through metallic bridges. Similarly, each touch sensing electrode may also be split into a plurality of touch sensing sub-electrodes which are insulated from each other, namely the touch sensing electrode may include a plurality of touch sensing sub-electrodes which are connected with each other through metallic bridges. For instance, in a diamond structure as illustrated in FIG. 2, one touch sensing electrode Rx is formed of six touch sensing sub-electrodes, namely one Rx is formed by Rx a, Rx b, Rx c, Rx d, Rx e and Rx f in FIG. 2. In a strip structure as illustrated in FIG. 3, one touch sensing electrode Rx is formed of two touch sensing sub-electrodes Rx a and Rx b which are connected with each other through a metallic bridge 01. Moreover, in the design of a pattern of the common electrode layer, only the touch driving electrodes may be designed to be formed of a plurality of touch driving sub-electrodes which are connected with each other through bridges, or only the touch sensing electrodes may be designed to be formed of a plurality of touch sensing sub-electrodes which are connected with each other through bridges, or both the touch driving electrodes and the touch sensing electrodes are designed to be formed of sub-electrodes which are connected with each other through bridges. No limitation thereto will be given here.

Figure 4:
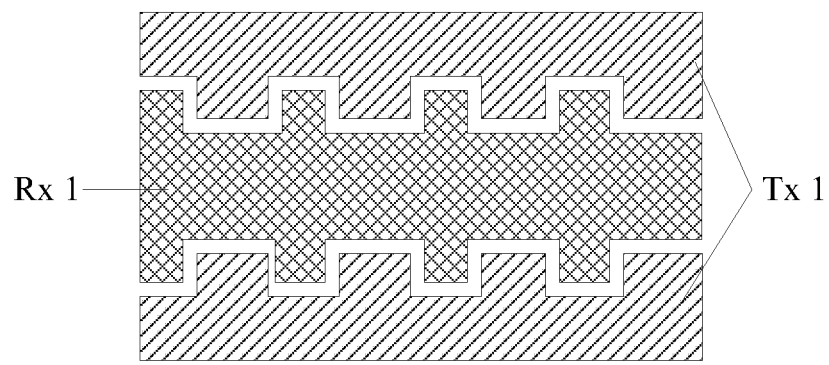
FIG. 4 is a schematic diagram illustrating the state in which opposing sides of touch sensing sub-electrodes and touch driving sub-electrodes in the touch screen panel provided by an embodiment of the present invention are in the shape of broken lines with a concave-convex structure.

FIG. 2 is a schematic diagram only illustrating the case in which the common electrode layer is split into the touch driving electrodes and the touch sensing electrodes, and the case that the opposing sides of the touch driving electrodes Tx and the touch sensing electrodes Rx are broken lines is not illustrated in the figure. But FIG. 3 illustrates the case that the opposing sides of touch driving sub-electrodes Tx and touch sensing sub-electrodes Rx are staircase broken lines, namely the opposing sides of adjacent touch sensing sub-electrodes and touch driving sub-electrodes, which are broken lines, have staircase structures, and the two staircase structures are consistent in shape and matched with each other. FIG. 4 illustrates the case that the opposing sides of touch driving sub-electrodes Tx1 and touch sensing sub-electrodes Rx1 are concave-convex broken lines, namely the opposing sides of adjacent touch sensing sub-electrodes and touch driving sub-electrodes, which are broken lines, have concave-convex structures, and the two concave-convex structures are consistent in shape and matched with each other. Moreover, in the specific examples, the case that the broken line structure of the opposite sides is a combination of the concave-convex structure and the staircase structure may also be present. Of course, the shape of the broken lines may also be specifically designed according to the actual requirement. No limitation thereto will be given here.

Moreover, as illustrated in FIG. 3, as the precision of the touch screen panel is generally in an order of millimeters but the precision of the LCD is generally in an order of micrometers, gaps of several columns of pixel units may be formed between the touch sensing electrodes Rx and the touch driving electrodes Tx when the touch sensing electrodes Rx and the touch driving electrodes Tx are arranged. In this case, common electrodes Vcom may also be disposed in the gaps of the common electrode layer, disposed between the touch sensing electrodes Rx and the touch driving electrodes Tx. The common electrodes Vcom are insulated from the touch sensing electrodes Rx and the touch driving electrodes Tx. Common electrode signals are loaded to the common electrodes Vcom during the operation, so as to guarantee that the pixel units in regions corresponding to the common electrodes Vcom can perform normal display operation.

Moreover, as the opposing sides of the touch driving sub-electrodes and the touch sensing sub-electrodes adopt the structure of broken lines, as illustrated in FIG. 3, the opposing sides of adjacent common electrodes Vcom1, Vcom2, Vcom3 and Vcom4 and the touch driving sub-electrodes Tx are broken lines, and the opposing sides of the adjacent common electrodes Vcom1, Vcom2, Vcom3 and Vcom4 and the touch sensing sub-electrodes Rx a and Rx b are broken lines as well.

Detailed description will be given below to the signal load means of the touch sensing electrodes, the touch driving electrodes, and the common electrodes in the common electrode layer of the touch screen panel.

In the specific examples, touch signal input lines electrically connected with the touch driving electrodes, sensing signal output lines electrically connected with the touch sensing electrodes, and common electrode signal input lines electrically connected with the common electrodes may be independently arranged on the array substrate. Moreover, the touch signal input lines, the sensing signal output lines and the common electrode input lines generally correspond to the gaps among various pixel units in the LCD panel in position, so that the normal display of the pixel units cannot be affected.

Furthermore, as the common electrode layer is generally made of a transparent electrode material such as indium tin oxide (ITO) material, in order to further reduce the resistance of the common electrode layer to the maximum degree and increase the signal-to-noise ratio when electrical signals are transmitted by various electrodes, the touch driving electrodes Tx may be electrically connected with corresponding touch signal input lines through a plurality of through holes; the touch sensing electrodes Rx may be electrically connected with corresponding sensing signal output lines through a plurality of through holes; and the common electrodes Vcom are electrically connected with corresponding common electrode signal input lines through a plurality of through holes. That is to say, ITO electrodes are in parallel connection with metallic resistances formed by signal lines, so that the resistance of the electrodes as a whole can be reduced to a great degree, and hence the signal-to-noise ratio when the signals are transmitted by the electrodes can be increased.

Based on the same inventive concept, an embodiment of the present invention further provides a capacitive touch module, which comprises a touch electrode layer provided with touch sensing electrodes and touch driving electrodes which are insulated from each other. Each touch sensing electrode includes a plurality of touch sensing sub-electrodes; each touch driving electrode includes a plurality of touch driving sub-electrodes; and opposing sides of adjacent touch sensing sub-electrodes and touch driving sub-electrodes are broken lines.

In the capacitive touch module provided by the embodiment of the present invention, in the specific examples, the broken line structure of the opposing sides of the adjacent touch sensing sub-electrodes and touch driving sub-electrodes may be the same with the concave-convex broken line structure as illustrated in FIG. 4 and may also be the same with the staircase broken line structure as illustrated in FIG. 3. No further description thereto will be given herein.

Based on the same inventive concept, an embodiment of the present invention further provides a display device, which comprises the capacitive in-cell touch screen panel provided by the embodiment of the present invention or the capacitive touch module provided by the embodiment of the present invention. The implementation of the display device may refer to the embodiments of the capacitive in-cell touch screen panel or the capacitive touch module. No further description thereto will be given herein.

In the capacitive touch module, the capacitive in-cell touch screen panel and the display device provided by the embodiments of the present invention, the integrally connected common electrode layer in the array substrate is split to form the touch sensing electrodes and the touch driving electrodes which are insulated from each other; and the touch driving electrodes and the touch sensing electrodes are subjected to time-sharing drive so as to achieve the touch function and the display function. Moreover, each touch sensing electrode includes a plurality of touch sensing sub-electrodes; each touch driving electrode includes a plurality of touch driving sub-electrodes; and opposing sides of adjacent touch sensing sub-electrodes and touch driving sub-electrodes are broken lines. Therefore, the opposing area between the adjacent touch driving electrodes and the adjacent touch sensing electrodes can be increased, and hence the mutual capacitance between the touch driving electrodes and the touch sensing electrodes within the unit area can be increased, and consequently the sensing sensitivity of the touch screen in the touch-control process can be improved.

Obviously, various changes and modifications can be made to the prevent invention by those skilled in the art without departing from the spirit and the scope of the present invention. Therefore, if the changes and modifications of the present invention fall within the scope of the appended claims of the present invention and equivalents thereof, the present invention is also intended to include the changes and modifications.

The invention claimed is:

1. A capacitive in-cell touch screen panel, comprising an array substrate provided with a common electrode layer, wherein the common electrode layer is provided with touch sensing electrodes and touch driving electrodes which are insulated from each other; each touch sensing electrode includes a plurality of touch sensing sub-electrodes; each touch driving electrode includes a plurality of touch driving sub-electrodes; opposing sides of adjacent touch sensing sub-electrodes and touch driving sub-electrodes are broken lines;

in a display interval, common electrode signals are applied to the touch driving electrodes and the touch sensing electrodes;

in a touch interval, touch scanning signals are applied to the touch driving electrodes, and the touch sensing electrodes are configured to generate by coupling and output voltage signals of the touch scanning signals;

common electrodes are disposed at gaps of the common electrode layer, between the touch sensing electrodes and the touch driving electrodes, and insulated from the touch sensing electrodes and the touch driving electrodes;

opposing sides of adjacent common electrodes and touch driving sub-electrodes are broken lines; and opposing sides of adjacent common electrodes and touch sensing sub-electrodes are broken lines;

wherein the array substrate of the touch screen is provided with touch signal input lines electrically connected with the touch driving electrodes, sensing signal output lines electrically connected with the touch sensing electrodes, and common electrode signal input lines electrically connected with the common electrodes;

the touch signal input lines, the sensing signal output lines, the common electrode signal input lines correspond to gaps between pixel units in a liquid crystal display (LCD) panel in position; and the touch driving electrodes are electrically connected with the touch signal input lines through a plurality of through holes; the touch sensing electrodes are electrically connected with the sensing signal output lines through a plurality of through holes; and the common electrodes are electrically connected with the common electrode signal input lines through a plurality of through holes.

2. The touch screen according to claim 1, wherein the opposing sides of the adjacent touch sensing sub-electrodes and touch driving sub-electrodes, which are broken lines, have staircase structures; and the two staircase structures are consistent in shape and matched with each other.

3. The touch screen according to claim 1, wherein the opposing sides of the adjacent touch sensing sub-electrodes and touch driving sub-electrodes, which are broken lines, have concave-convex structures; and the two concave-convex structures are consistent in shape and matched with each other.

4. The touch screen according to claim 1, wherein the array substrate is a color filter substrate or a thin-film transistor (TFT) array substrate in a liquid crystal display (LCD) panel.

5. The touch screen according to claim 1, wherein the touch sensing electrodes are arranged along a column direction of pixel units in an LCD panel, and the touch driving electrodes are arranged along a row direction of the pixel units in the LCD panel; or the touch sensing electrodes are arranged along a row direction of pixel units in an LCD panel, and the touch driving electrodes are arranged along a column direction of the pixel units in the LCD panel.

6. The touch screen according to claim 1, wherein the touch driving electrodes and the touch sensing electrodes have a strip electrode structure or a diamond electrode structure.

* * * * *